Feb. 28, 1967 F. W. NEILSON ET AL 3,307,052
PIEZOELECTRIC STRESS GAGE
Filed April 6, 1964

INVENTORS
Frank W. Neilson
Robert A. Graham
William B. Benedick
BY
Roland A. Anderson
Attorney

United States Patent Office 3,307,052
Patented Feb. 28, 1967

---

3,307,052
PIEZOELECTRIC STRESS GAGE
Frank W. Neilson, Robert A. Graham, and William B. Benedick, Albuquerque, N. Mex., assignors, by mesne assignments, to the United States of America as represented by the United States Atomic Energy Commission
Filed Apr. 6, 1964, Ser. No. 357,844
1 Claim. (Cl. 310—8)

This invention relates generally to the field of stress gages and more particularly to devices of this character which depend basically for their operation on the use of quartz as a piezoelectric transducer. The invention encompasses specifically a form of piezoelectric quartz stress gage uniquely adapted to obtain accurate stress-time profiles of high amplitude waves in materials loaded dynamically in a state of one-dimensional strain.

A problem of considerable interest today is the study of the mechanical behavior of a variety of materials, for example, steels and plastics, under a suddenly applied high amplitude finite stress such as the detonation of a high explosive or the impact of a projectile. The propagation of compressive stress waves in solids is reasonably well understood for low amplitude elastic waves and extremely high amplitude waves for which the plastic shock wave velocity exceeds the maximum elastic wave velocity and the effects of material rigidity are negligible. Between these two extremes when the stress amplitude is perhaps one to ten times the elastic limit, a single shock front is unstable and separates into two fronts: a forerunning elastic wave followed by a slower plastic wave which compresses the material to the final stress. High amplitude dynamic loading up to at least 21 kilobars is typically productive of stress-time profiles within a solid involving such separated elastic and plastic wave fronts. A study of such profiles may be expected to furnish important data concerning material characteristics such as yielding, strain rate dependence, work-hardening, frequency and amplitude dispersion, and attenuation in the medium.

The known properties of piezoelectric materials have suggested their use in the construction of prior art stress gages. For example, a tourmaline stress gage known as the Goranson gage utilizing a piezoelectric effect has been employed to measure dynamic stress functions in metals but its principle of operation is different from the gage of the present invention. (See "Dynamic Determination of the Compressibility of Metals" by Goranson et al., Journal of Applied Physics, vol. 26, pp. 1472–1479, December 1955.) The operation of the Goranson gage is visualized as giving a signal due to stressing the entire gage uniformly so that the electric charge is proportional to the stress. This is accomplished in practice by making the thickness of the gage small enough so that the time for a stress wave to propagate through the gage is very short relative to the time variations in stress to be measured. This allows the stress wave in the gage to reverberate many times and therefore set up a locally uniform stress throughout the gage. Devices of this type are in general subject to "ringing," i.e., resonant oscillations of the device due to stress variations in phase with the natural period of the gage vibration. The requirement for numerous reverberations limits the time resolution of the gage since a fixed time must elapse after the stress application before the true stress is indicated. Thus where stress time functions of extremely short duration are to be measured, for example, on the order of $10^{-8}$ seconds, in which detailed and highly accurate data concerning the transition from elastic to plastic wave fronts is essential to an evaluation of material characteristics, the Goranson device is not useful. Furthermore, the Goranson gage is not subject to calibration and there has been no verification that the piezoelectric properties of tourmaline are valid for very high amplitude stresses.

It is a general object of this invention to provide an improved piezoelectric stress gage adapted to obtain the stress as a function of time in a material subjected to a suddenly applied force of extremely short duration and large amplitude.

It is a further object of this invention to provide such an improved piezoelectric stress gage wherein undesirable wave propagation effects are eliminated and very short time resolution can be obtained.

A general form of piezoelectric stress gage which circumvents the difficulties enumerated above has been disclosed heretofore in a paper entitled "Dynamic Yield Behavior of Explosively Loaded Materials Determined by a Quartz Transducer Technique" by Jones et al., Journal of Applied Physics, vol. 33, No. 11, pp. 3224–3232, November 1962. This prior art gage employs a short right circular cylinder of piezoelectric quartz, the axis of which is placed parallel to the axis of propagation of the shock wave. Current produced by the gage is measured across a low resistance between ground and an output electrode applied to the output surface of the gage, such output electrode and output surface being of equal diameter. The principle of operation of this gage requires that the time for a stress wave to propagate through the gage is long relative to the time variation in the stress to be measured. During use the crystal is then stressed nonuniformly along its length, with the length of the stressed portion varying as a function of time.

This latter described gage is, however, found to be subject to several important disadvantages. In the first place, the output signal is distorted due to electrical field fringing at the edges of the gage in a manner similar to a parallel plate capacitor. This fringing is due to the abrupt termination of the electric potential at the boundary of the gage electrode and the surrounding medium such as, for example, a potting compound. Furthermore, as a stress wave propagates through the gage, unloading waves originate from the lateral boundaries of the gage owing to difference in mechanical properties between the gage material and that of its surroundings such as shear wave velocity, dilatational velocity, and density. Such unloading waves propagate laterally inward within the gage producing added piezoelectric charge at the output electrode. Finally, in this prior art gage it is found that this added piezoelectric charge due to the unloading stress waves creates further field fringing which distorts the electric field lines of the gage in advance of the position of the unloading waves in a lateral sense. The net effect of these various forms of distortion frequently produces errors in signal amplitude as high as 25% rendering such a device unworkable where highly accurate analysis of stress-time profiles is essential. It was determined by the inventors that these distortions were unavoidable in a so-called fully electroded gage wherein the input and output electrodes were substantially coextensive with their respective flat gage surfaces.

It is therefore a more specific object of the present gage to eliminate the signal distortion between stress input and current output which is inherent in prior art fully electroded quartz gages.

These and additional objects and advantages are achieved in accordance with the present invention by providing a piezoelectric quartz gage consisting essentially of a right circular disk of X-cut alpha quartz properly oriented with respect to the direction of the stress-time function in a material specimen to be measured. The input surface of the disk is at ground potential and forms an interface with a mating surface of the material specimen whereby the stress-time function may be applied to such input surface and wherein further the output surface of the disk has affixed thereto an inner circular gage electrode and an outer guard ring electrode electrically isolated from said inner gage electrode, the outer guard ring electrode extending to the periphery of the disk. Relative dimensions of outer guard ring electrode width versus gage thickness and relative cross-sectional area of electrical isolation and inner gage electrode contribute importantly to the accuracy achievable with this gage. Circuit means are provided which connect the gage and guard ring electrodes with ground potential whereby a current pulse may be applied to an external circuit proportional to the stress seen at the disk input surface, where such circuit has a relatively short time constant with respect to the desired time resolution.

The scope of this invention will become more readily apparent from consideration of the detailed description to follow taken in conjunction with the attached drawings, in which.

Figure 2:
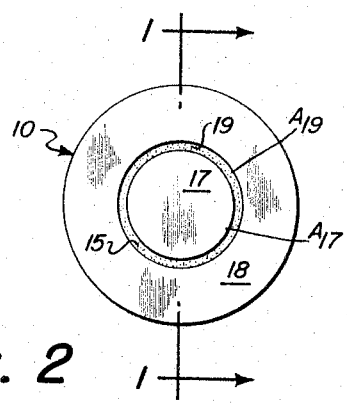
FIG. 2 is an elevational view of the output surface of the gage of this invention.
Figure 1:
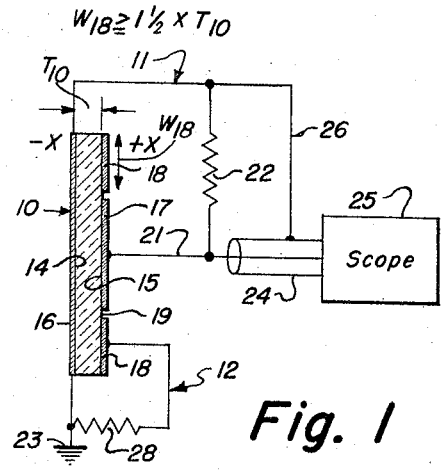
FIG. 1 is a sectional view of the gage taken along line 1—1 in FIG. 2.

With reference now to FIG. 1, there is seen a section view of the gage of this invention taken along line 1—1 in FIG. 2. The gage consists essentially of a thin electroded right circular quartz disk 10 together with co-operating output circuit means 11 and dummy shunt circuit means 12. Disk 10 has parallel flat input and output surfaces 14 and 15, respectively. The thickness of disk 10 is designated as $T_{10}$. A thin conductive ground electrode 16 may be adherently coated on input surface 14 substantially coextensive therewith. Any other mechanically and electrically equivalent means of grounding input surface 14 will also be acceptable. On output surface 15 a centrally positioned circular gage electrode 17 and an outer concentric guard ring electrode 18 are also adherently coated. Guard ring electrode 18 extends to the periphery of surface 15 and is separated from gage electrode 17 by insulating ring 19. The width of guard ring electrode 18 is designated as $W_{18}$. Ground electrode 16, gage electrode 17, and guard ring electrode 18 may be conveniently formed by vacuum vapor deposition of a thin layer of silver, for example, from 50 to 100 microinches over a chromium substrate. The chromium in such case adheres to quartz surfaces 14 and 15 while the silver produces a highly conductive layer.

Output circuit means 11 includes output lead 21, which is connected through shunt resistor 22 to ground electrode 16 and thence to any suitable ground connection 23. Output lead 21 may be connected through coaxial cable 24 to oscilloscope 25. A ground return for oscilloscope 25 may be provided through connection 26.

Dummy shunt circuit means 12 consists of any suitable electrical connection through dummy shunt resistor 28 to ground connection 23. It should be understood that all electrical connections to electrodes 16, 17 and 18 may be made with simple solder joints or conductive adhesive. Resistor 28 is adjusted to produce an external potential for guard ring electrode 18 which is approximately equal to that for gage electrode 17. Where the ratio of resistances 22 and 28 is inversely proportional to the ratio of areas of gage electrode 17 and guard ring electrode 18, there will be a minimum of difference in electrical potential between these two electrodes.

As seen more clearly in FIG. 2, ring 19 on surface 15 provides necessary electrical isolation between gage electrode 17 and guard ring electrode 18. The cross-sectional area of gage electrode 17 is designated as $A_{17}$. The cross-sectional area of guard ring 19 is designated as $A_{19}$. Ring 19 may conveniently be prepared by sandblasting or cutting on a lathe through a continuous conductive layer on surface 15 or by means of suitable masking techniques. The gage in use is surrounded with a potting compound, for example, an epoxy resin type, which will flow into the volume created by ring 19 and improve its electrical insulation properties. Gage electrode 17, guard ring electrode 18, and insulating ring 19 have quantitative relationships with respect to dimensions and cross-sectional area which are of extreme importance in order to obtain accurate results with the quartz gage of this invention, as will be described in more detail below.

It will be understood that disk 10 may be cut from a single crystal quartz so that a piezoelectric response will be achieved by applying a stress between the flat surfaces 14 and 15 of disk 10 and so that a symmetry in elastic properties is achieved whereby an applied longitudinal transient motion to the gage results in a longitudinal motion within the gage. Additional properties which disk 10 must display to function properly in this gage are a linear reproducible relation between applied stress and electric charge produced from piezoelectric effect, negligible conductivity, negligible change in dielectric constant with stress and electric field, and negligible change in longitudinal wave propagation velocity with stress. This may be achieved, for example, by a thin right circular disk of X-cut synthetic or natural alpha quartz. It will be further understood that the orientation of disk 10 must be properly chosen with respect to the type of stress wave to which disk 10 will be subjected. For example, when the $-x$ and $+x$ electrodes of the gage are established, as shown in FIG. 1, by noting the electrical polarity of the gage under static compression, the gage must be positively oriented so that a compressive stress produced by an impulsive load propagates from the $-x$ to the $+x$ electrode. The relative dimensions of diameter and thickness or length for disk 10 also have an important bearing upon the operation of the device and will be better understood following an explanation of such operation.

Figure 3:
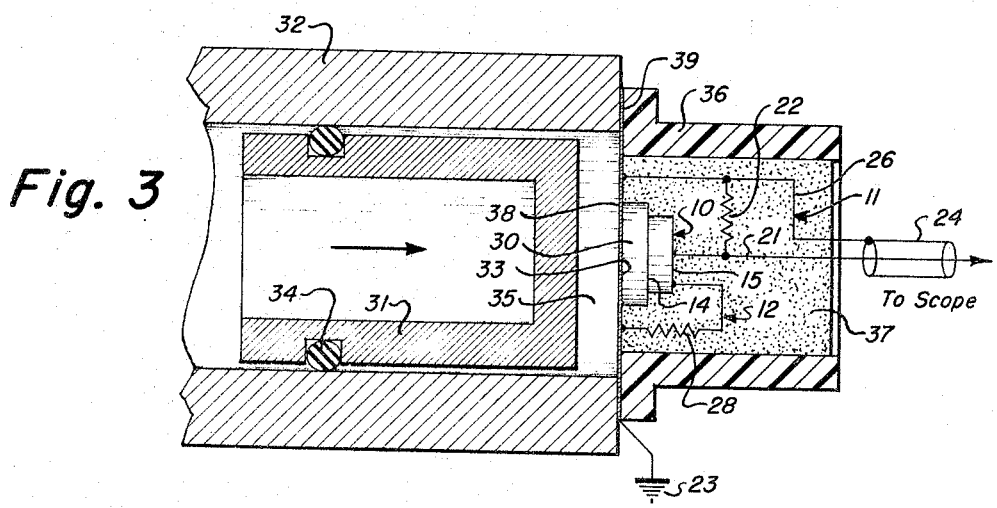
FIG. 3 is a typical test apparatus employing the gage of this invention.

FIG. 3 illustrates a typical test apparatus incorporating the gage of this invention for the purpose of obtaining a stress-time profile at the impact interface between disk 10 and a material specimen 30. In such test operation dynamic loading of specimen 30 is achieved by propelling projectile 31 along the bore of gun barrel 32 into contact with input surface 33 of specimen 30. To prevent the buildup of an air cushion between projectile 31 and specimen surface 33 prior to impact, gun barrel 32 may be evacuated to a low pressure. Suitable O-ring sealing means 34 affixed to the outer periphery of projectile 31 maintain a low pressure in air volume 35 ahead of projectile 31. Disk 10 and specimen 30, together with adjacent portions of circuit means 11 and 12, may be held rigidly in position within a target cup 36 by means of potting 37. Input surface 33 of specimen 30 may be in substantial lateral alignment with peripheral flange surface 38 of target cup 36 and intervening surfaces of potting 37. To insure good electrical continuity between input surface 33 and ground connection 23, a continuous conductive layer 39 may be vapor coated on input surface 33, flange surface 38 and said intervening surfaces of potting 37. If specimen 30 is nonmetallic, suitable conductive coating means may be provided thereon for contact between ground electrode 16 on disk 10 and ground connection 23. It will be understood that disk 10 is axially aligned with the direction of application of compressive force through projectile 31 and positively oriented with respect thereto.

In operation, when projectile 31 strikes specimen 30, the latter, assuming no angular misalignment with projectile 31, is loaded dynamically in a state of one-dimensional strain. The resulting elastic-plastic wave propagates through specimen 30 and from input surface 14 to output surface 15 of disk 10. The gage produces a current signal responsive to the stress-time profile existing at the interface between specimen 30 and disk 10 which is given by the equation:

$$i = \frac{kAu_s}{l} \sigma \quad 0 < t < \frac{l}{u_s}$$

where:

$i$ = short circuit current to an external load
$k$ = one-dimensional strain piezoelectric constant for the material used
$A$ = gage electrode area
$u_s$ = dilatational wave velocity
$\sigma$ = time dependent stress at the gage input surface
$l$ = length of the gage
$t$ = time For times greater than $l/u_s$, current $i$ is proportional to the stress difference between the two faces of the gage.

The output current produced by the gage of this invention is determined from the potential drop produced across resistor 22 which may conveniently be about 10 ohms. This amount of resistance combined with a low gage capacitance, for example, on the order of 10 micromicrofarads, results in an essential short circuit across the gage for the time of interest. The current pulse produced in the above fashion may be applied to scope 25 where with suitable optical assistance an oscillograph record can be made of the current pulse. By application of the current-stress equation above, one may readily calculate the equivalent stress-time function or profile existing at the interface between specimen 30 and disk 10. The apparatus depicted in FIG. 3 is merely illustrative of the application to a material specimen of a suddenly applied high amplitude one-dimensional strain and is nowise to be regarded as a limitation on the manner in which the gage of this invention may be used.

Figure 4:
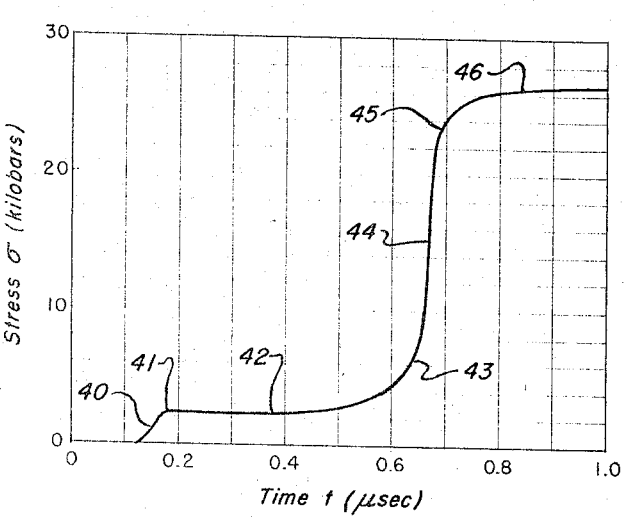
FIG. 4 is a stress-time function for a particular material specimen obtained through the use of the gage of this invention.

FIG. 4 illustrates a stress-time profile obtained for a sample of iron alloy containing 30% nickel using the gage of this invention where the sample experiences a stress level of approximately 43 kilobars, the effective magnitude of such stress at the specimen-gage interface being limited to about 26 kilobars by the relative acoustic impedance of specimen 30 and gage 10. Beginning at $t \approx 0.125$ microsecond, the profile shows a forerunning elastic wave front 40 of high rise-rate terminating at point 41 on the profile at which $\sigma \approx 2.4$ kilobars. Thereafter, a transition region 42 of moderate rise-rate persists until $t \approx 0.65$ microseconds at which time $\sigma \approx 6$ kilobars (point 43 on the profile). A slower plastic wave front 44 of high rise-rate now follows bringing the stress value at $t \approx 0.7$ microsecond to $\sigma \approx 24$ kilobars (profile point 45). Thereafter the functional value in region 46 remains substantially constant during the application of the dynamic loading. While detailed analysis of such an elastic plastic stress-time function is not pertinent to the present application, it may be noted that the material characteristics deducible from such function depend importantly on a very short time resolution capability for the stress gage. With a profile such as that shown in FIG. 4, an inspection of a functional trend over a period of time as small as $10^{-8}$ seconds is obviously possible. As pointed out earlier in this case, this very short time resolution capability is one of the important advantages of the piezoelectric gage of this invention.

The accuracy of the stress-time profile obtainable with the piezoelectric gage of this invention is dependent importantly upon a number of factors. First, it is necessary to insure that the transit time of the wave front through disk 10 is greater than the duration of the stress-time function to be measured. This is essential in order that gage current output be directly proportional to the interface stress between specimen 30 and disk 10. Typically, disk 10 may have a thickness of 0.2 in. which gives an effective recording time of about 1 microsecond but obviously this thickness will vary in accordance with the duration of the stress-time profile to be recorded.

In order to insure one-dimensional behavior within the quartz material under gage electrode 17 during wave transit time through disk 10 and achieve the absence of signal distortion which constitutes the most important feature of the gage of this invention, it has also been found necessary in practice to make outer guard ring electrode 18 of a width no less than 1.5 times the thickness of disk 10 from input surface 14 to output surface 15. This dimensional relationship is indicated in FIG. 1 by the accompanying equation $W_{18} \geq 1\frac{1}{2} \times T_{10}$. This necessary width relationship has been determined as a result of long and careful experimentation in which the various influences tending to produce signal distortion in the current output of the gage of this invention have been analyzed. It has been learned that of these influences, the most critical is the field fringing resulting from the added piezoelectric effect originating from the unloading waves. This field fringing moving laterally inward occurs in time considerably ahead of the unloading waves which are also moving laterally inward and thus must be reckoned with first. The ratio of width of guard ring electrode 18 to thickness of disk 10 is such that the referenced field fringing does not propagate inward to any portion of disk 10 longitudinally aligned with gage electrode 17 until after the dilatational wave in disk 10 has arrived at output surface 15 and the desired stress-time function has been obtained. This time relationship insures that the following unloading waves will in like manner fail to interfere with the gage current output during transit time of the dilatational wave.

The capacitive field fringing which continues to occur at the outer periphery of disk 10 will be isolated from the effective current output of the gage by insulating gage electrode 17 from guard ring electrode 18 by means of insulating ring 19. However, it was learned that as the dilatational wave progresses through disk 10, a distortion of the electric field within the quartz exists in the areas longitudinally aligned with insulating ring 19, since all electric field lines within disk 10 must terminate at an electrode, either gage electrode 17 or guard ring electrode 18. As the wave approaches output surface 15, this distortion becomes progressively more pronounced. Experiments have indicated that in order to substantially eliminate this distortion effect, the area of ring 19 must be a very small percentage, about 3½ percent of the area of gage electrode 17. In FIG. 2 this proportionality requirement has been expressed by the accompanying equation $A_{19} \leq 3\frac{1}{2}\% A_{17}$. Practical drafting limitations make it impossible to illustrate such proportionality accurately in FIG. 2.

A gage constructed in accordance with the teaching of this invention may be expected to reduce errors in signals amplitude of gage output current to virtually undetectable levels. Typical dimensions for a gage so constructed may be a disk 10 having a diameter of 1.25 in. and a thickness of 0.2 in., 0.6 in. for diameter of gage electrode 17, 0.003 in. for width of ring 19, and 0.322 in. for width of guard ring electrode 18.

What has been described in an improved piezoelectric quartz stress gage with unique advantages attributable to the incorporation of its special guard ring feature, with particular emphasis on the critical nature of the shape of the gage material employed and the dimensions and spacing of the electroded areas. It will be understood that the particular context in which the gage of this invention has been described is to be regarded as purely illustrative and not as limitation.

What is claimed is:

In a piezoelectric stress gage for obtaining a stress time profile of known duration with given time resolution in a material specimen subjected dynamically to a one-dimensional compressive stress employing a right circular disk of preselected thickness of X-cut alpha quartz positively oriented with respect to the direction of said compressive stress in which said disk has a fully electroded input surface at ground potential and in stress receiving contact with said material specimen and an output surface having adherently coated thereon a centrally positioned inner circular gage electrode and an outer guard ring electrode extending to the periphery of said output surface, said guard ring electrode being concentric with and spaced radially outward of said gage electrode to form an insulating ring therebetween on said output surface, and in which circuit means are connected between said guard ring electrode and ground potential whereby an external field may be produced for said guard ring electrode approximately equal to that for said gage electrode, and in which additional circuit means are connected between said gage electrode and ground potential whereby a current pulse may be applied to an external circuit proportional to the compressive stress at said input surface, said external circuit having a relatively short time constant with respect to said time resolution, the improvement comprising the selection of said guard ring electrode such that its width ($W_{18}$) shall be not less than one and one-half times the thickness ($T_{10}$) of said disk and the surface area ($A_{19}$) of said insulating ring shall be not more than 3½ percent of the area ($A_{17}$) of said gage electrode.

References Cited by the Examiner

UNITED STATES PATENTS 2,956,184    10/1960    Pollack _____ 310—9.6

OTHER REFERENCES

Journal of Applied Physics, vol. 33, No. 11, dated November 1962, article entitled Dynamic Yield Behavior of Explosively Loaded Metals Determined by a Quartz Transducer Technique, by O. E. Jones, F. W. Neilson and W. B. Benedick, pp. 3224–3232.

MILTON O. HIRSHFIELD, *Primary Examiner.*

J. D. MILLER, *Assistant Examiner.*